June 20, 1933.     R. C. MERCER     1,914,726
FILM PATCH
Filed April 14, 1930
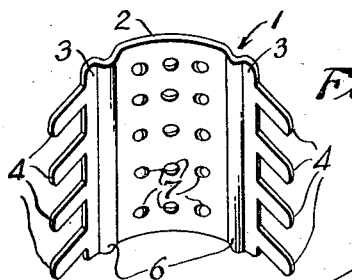
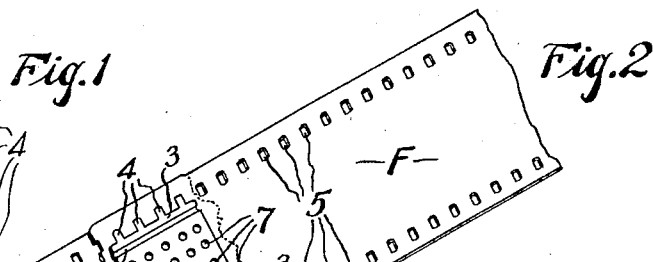
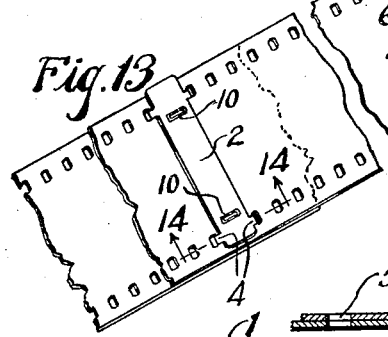
INVENTOR.
Raymond C. Mercer
BY
ATTORNEYS Patented June 20, 1933

1,914,726

UNITED STATES PATENT OFFICE

RAYMOND C. MERCER, OF LOS ANGELES, CALIFORNIA

FILM PATCH

Application filed April 14, 1930. Serial No. 444,147.

My invention relates to and has for an object the provision of an improved type of film patch applicable to motion picture films whereby two or more sections of film may be secured together at their overlapping ends for the purpose of continuously printing, developing, drying, or otherwise using or treating the film in motion picture operations.

In consideration of this invention reference is had to my Letters Patent No. 1,389,523, which were granted to me on Aug. 30, 1921, for a film patch. My present invention contemplates the improvement of my original patch as shown in said Letters Patent, particularly with respect to the form of the patch whereby the central portion or body of the patch may be supported slightly above the adjacent surface of a film so that the solutions used in the treatment of the film may readily attack that portion of the film beneath the patch.

Another object is to provide means at the sides of the patch for engagement with opposite sides of the film sections whereby the film and patch may retain a substantially flat cross section, thus preventing the edges of the film from curling as is possible with other types of patches not so arranged.

Still other objects will appear as the description of my invention progresses.

In the accompanying drawing I have shown a preferred form of invention embodying several modifications, in which Fig. 1 is a perspective view of a form of film patch having laterally extended teeth for engaging the perforations of the film, longitudinally extended ribs inwardly of the teeth for supporting the patch above the surface of the film, and perforations in the body of the patch whereby the solutions may readily attack the coating of the films in developing or other operations.

Fig. 2 is a view of two or more film sections secured together at their overlapping end portions by means of the form of patch shown in Fig. 1.

Fig. 3 is a bottom view of a modified form of patch showing the patch indented on its upper side to provide expressions on the lower side of the patch in lieu of the ribs shown in Fig. 1.

Fig. 4 is a transverse section of the same on line 4—4 of Fig. 3.

Figs. 5, 6 and 7 are respectively cross sectional views of a pair of film sections and one of my improved film patches with the patch and films arranged preliminary to the attachment of the patch to the film, with the patch partially attached to the film, and with the patch completely attached to the film.

Fig. 8 is another modification of my improvements showing a substantially narrower film patch with the teeth disposed longitudinally instead of transversely with the film for engagement with the perforations.

Fig. 9 is a longitudinal section of the same on line 9—9 of Fig. 8.

Fig. 10 is a transverse section of the same on line 10—10 of Fig. 9.

Fig. 11 illustrates another form of film patch similar to the form illustrated in Fig. 1, but provided in addition to the elements of Fig. 1 with auxiliary lateral projections alternating with the laterally disposed teeth for overlying the opposite side of the film from that covered by the teeth.

Fig. 12 is a transverse section of the same on line 12—12 of Fig. 11.

Fig. 13 is a view of a pair of film sections secured together by means of the form of patch shown in Figs. 8, 9 and 10.

Fig. 14 is a transverse section of the same on line 14—14 of Fig. 13.

In all of the forms of patches illustrated in the drawing, the width of the patch approximately corresponds to that of one of the frames of standard size on the film.

Referring to Fig. 1 particularly, the patch 1 is made of sheet metal, preferably of arcuate cross section with a central body portion 2, edge portions 3—3, and a plurality of teeth 4, 4 etc., projecting laterally from the edge portions 3 and spaced apart uniformly to correspond to spacings of the perforations, as at 5, 5 etc., on a standard film, as at F.

Intermediate the body portion 2 and the edge portions 3, 3, I provide longitudinal indentations 6, 6 which may extend from end to end of the patch so as to form ribs on the lower side of the body which are adapted to rest upon those portions of the film F externally of the frames of the pictures but internally and immediately adjacent the perforations 5, 5. I may also provide the body portion 2 with a plurality of perforations, as at 7, 7 etc., which, together with the ribs 6, permit the solutions with which the films are treated to readily enter the space between the body 2 of the patch and the adjacent surface of the film F, whereby such portion of the film may be treated corresponding to and simultaneously with the treatment of the entire film.

As shown in Figs. 3 and 4, I may form the film patch 1 with a plurality of indentations 8, 8 formed on the upper side of the patch in longitudinal alinement in lieu of the ribs 6 shown in Fig. 1. Such indentations form expressions or projections on the lower side of the film as shown in Figs. 3 and 4 and serve the same purpose as the ribs.

As shown in Figs. 11 and 12, I may otherwise modify the form of my film patch by forming the body thereof in the manner shown in Fig. 1, or as shown in Fig. 2 with the ribs 6 or indentations 8, but the sides of this form of patch are each provided with a plurality of auxiliary teeth or projections 9, 9 etc., which alternate with the teeth 4.

In all of the three forms thus far described the patches are of arcuate cross section with the teeth 4 extending at corresponding angles from the body 2 so that as shown in Fig. 5 the teeth may readily be inserted in the perforations 5 of two sections of film F and F'. Thereafter, as indicated in Fig. 6, when the teeth 4 are properly positioned in the perforations 5, the body of the patch is gradually flattened out until it assumes the form shown in Fig. 7 with the body 2 and the teeth 4 in a common plane, or nearly so.

It will be understood that the films F and F' are necessarily curved slightly out of the flat plane when the patch assumes a flat cross section, but the illustration in the drawing exaggerates the relative form of the patch and films. When the form of device shown in Figs. 11 and 12 is used, however, the teeth 4 assume a position as, for instance, beneath the film F', while the auxiliary teeth 9 extend over the upper section of film F. In this manner the lateral curved portions of the film are caused to more nearly assume the plane of the patch, and the film is almost, if not quite, flat in cross section.

In the form of patch shown in Figs. 8, 9 and 10, the body 2 of the patch is relatively narrow when compared with the other forms herein described. In this form, however, the teeth 4, 4 are formed at the ends of the body and are adapted to extend longitudinally of the films F and F' and thru the perforations 5 thereof instead of transversely, as in the other forms.

Indentations of suitable form, as at 10, may be formed inwardly of the teeth 4 but outwardly of the frames of the picture, as in the other cases, for the purpose of supporting the body of the patch out of contact with the film.

In this last mentioned form of device the teeth 4 are adapted to be inserted thru the adjacent perforations 5 on opposite sides of the film and thence bent substantially at right angles so as to form a lock around the films, as shown in Fig. 14.

It will be quite evident to those familiar with the motion picture art that I have provided and have illustrated and described herein a form of film patch which is extremely advantageous in the handling and preparing of films in the motion picture laboratory which is economical from a standpoint of manufacture and use, durable, and of great convenience to film operators.

What I claim is:

1. A film patch for connecting the overlapped ends of motion picture film comprising a sheet of material provided with a central body portion, and two groups of alternate projections on two opposite sides thereof spaced apart to correspond to the spacing of the perforations in said film, one group of said projections adapted to overlie and the other group to underlie the overlapped portions of the film.

2. A film patch for connecting the overlapped ends of motion picture film comprising a sheet of material provided with a central body portion, and two groups of alternate projections on two opposite sides thereof spaced apart to correspond to the spacing of the perforations in said film, one group of said projections adapted to overlie and the other group to underlie the overlapped portions of the film, said body portion being perforated for the purpose described.

3. A film patch as characterized in claim 1, including means formed thereon inwardly of said projections for supporting the body portion out of contact with the adjacent film.

4. A film patch comprising an integral sheet of material for connecting overlapped portions of motion picture film and adapted to be disposed transversely of said film, projections on one side and near the opposite ends thereby for supporting said member out of contact with the adjacent film, said projections engaging the film at points inwardly of the sprocket perforations and a plurality of teeth on two opposite ends of said member for engaging the sprocket perforations at the edges of the film for the purpose described, the body portion of said member being perforated.

RAYMOND C. MERCER.